(12) United States Patent
Jan et al.

(10) Patent No.: US 7,042,508 B2
(45) Date of Patent: May 9, 2006

(54) METHOD FOR PRESENTING FISHEYE-CAMERA IMAGES

(75) Inventors: Gwo-Jen Jan, Taipei (TW); Chuang-Jan Chang, Taipei (TW)

(73) Assignee: Appro Technology Inc., Taipei Hsien (TW)

( * ) Notice: Subject to any disclaimer, the term of this patent is extended or adjusted under 35 U.S.C. 154(b) by 756 days.

(21) Appl. No.: 10/234,258

(22) Filed: Sep. 5, 2002

(65) Prior Publication Data

US 2004/0046888 A1    Mar. 11, 2004

(51) Int. Cl.
*H04N 5/225* (2006.01)
(52) U.S. Cl. .................................. 348/335; 348/207.99
(58) Field of Classification Search ................ 348/335, 348/36, 39, 143
See application file for complete search history.

(56) References Cited

U.S. PATENT DOCUMENTS

| | | | |
|---|---|---|---|
| 5,185,667 A | | 2/1993 | Zimmermann |
| 5,313,306 A | | 5/1994 | Kuban et al. |
| 5,359,363 A | | 10/1994 | Kuban et al. |
| 5,384,588 A | | 1/1995 | Martin et al. |
| 5,796,426 A | * | 8/1998 | Gullichsen et al. .... 348/207.99 |
| 6,118,474 A | | 9/2000 | Nayar |
| 6,256,058 B1 | | 7/2001 | Kang et al. |
| 6,288,843 B1 | | 9/2001 | Angelo et al. |
| 6,493,032 B1 | * | 12/2002 | Wallerstein et al. ........ 348/335 |
| 6,593,969 B1 | * | 7/2003 | Driscoll et al. ............. 348/335 |

OTHER PUBLICATIONS

Margaret M. Fleck, "Perspective Projection: The Wrong Imaging Model", Department of Computer Science, University of Iowa, pp. 1-27.
Arthur H. Robinson, "Elements of Cartography", Sixth Edition, pp. 42-111.

* cited by examiner

*Primary Examiner*—Tuan Ho
(74) *Attorney, Agent, or Firm*—Birch, Stewart, Kolasch & Birch, LLP

(57) ABSTRACT

The present invention is a method for presenting the fisheye-camera images. A calibration target with a concentric-and-symmetric pattern (PCT) is utilized to assist in parameterizing a fisheye camera (FIS) in order to ascertain the optical parameters comprising the principal point, the focal length constant and the projection function of the FIS. Hence, the position of an imaged point referring to the principal point on the image plane directly reflects its corresponding zenithal distance $\alpha$ and azimuthal distance $\beta$ of the sight ray in space so as to normalize the imaged point onto a small sphere. Further according to the map projections in cartography capable of transforming the global geometry into flap maps, the interesting area in a field of view can be accordingly transformed by a proper projection method. The image transforming method disclosed in the invention is simple, low-cost, suitable to various FISs with different projection mechanisms and capable of transforming the fisheye-camera images for particular functions, such as the approach of normal human visual perception, video data encryption, and image compression/transformation with a high fidelity.

28 Claims, 13 Drawing Sheets

METHOD FOR PRESENTING FISHEYE-CAMERA IMAGES

BACKGROUND OF THE INVENTION

1. Field of Invention

The invention relates to a method for presenting fisheye-camera images, and in particular to a method integrating the multicollimator metrology and cartography in order to systematically describe the projection mechanism of the fisheye camera and to transform the fisheye-camera images into ones suitable for advanced visual applications.

2. Related Art

The camera systems in the field of artificial vision preferred using lenses with a narrow field of view (FOV) in order to obtain images approaching an ideal perspective projection mechanism for precise measurement. The perspective projection is usually a basis to deduce the camera's parameters while modeling the barrel distortion with a polynomial in the variable of the image's dimensions. The obtained intrinsic and extrinsic parameters can be employed to the visual applications in the quest for better precision, such as 3-D cubical inference, stereoscopy, automatic optical inspection, etc. These applications, however, currently have a common limitation of narrow visual angles and insufficient depth of field.

A fisheye camera (also termed a fisheye image sensor, FIS) can capture a clear image with a FOV of over 180 degrees, but a severer barrel distortion comes along. Because the projection function of the FIS is far from the prospective projection, the optical parameters cannot be deduced by those methods, which directly relate to the rectilinear mechanism of the perspective projection, for the normal cameras. Technologies developed for the usual visual disciplines resulted in no capability to process the images of the FIS.

Eventually, the panospherical imaging skipped from using the FIS (also called a dioptric sensor) to alternatively developing various camera systems with complex reflective optical elements (also called catadioptric sensors) as compensation. These solutions employed optical components such as reflectors or prisms to take panoramic views; for instance, the technologies were disclosed in the U.S. Pat. Nos. 6,118,474 and 6,288,843 B1. However, the catadioptric systems often elongate the ray traces, complicate the image-forming mechanism and attenuate the imaging signals due to indirectly taking the reflective images through the added optical elements. A blind area will be unavoidable at the center of an image because of the front installation of the reflective element.

For expanding the FOV, the camera system with a mechanical pan-tilt-zoom motoring function is another solution in the related art, which takes surrounding images in a row to achieve a panoramic view, for instance, the technology disclosed in the U.S. Pat. No. 6,256,058 B1. Or, contrarily, a number of cameras are employed instead to simultaneously capture images in different directions for seaming a panorama. However, the first method of a rotation type cannot take a whole scene at the same time so that a drawback of asynchronism remains. Furthermore, the volume of both systems is hardly to be shrunk to approach a hidden function or to take a close-range view; not to mention the heavy weights of the camera bodies consume more electricity and the rotating device is easier to get out of order. In addition the extra cost of multi-cameras, the sampling and integration of the images from individual cameras still present many further problems.

Thus, adopting the lenses with a very wide FOV to take a whole scene in a single shot is a tendency of this kind of camera systems while considering many practical requirements in applications. An image-based algorithm aiming at the FIS assumed that the lens conforms to a specific projection mechanism so as to deduce the optical parameters without any calibration target. With reference to FIG. 1A and FIG. 1B, wherein FIG. 1A expresses the imageable area 1 of a FIS in a framed oval/circular region and FIG. 1B is the corresponding spatial projecting geometry of FIG. 1A, both figures note the zenithal distances of $\alpha$, which are the angles respectively defined by incident rays and the optical axis 21, and the azimuthal distances of $\beta$, which are the angles surrounding the optical axis 21 (or the principal point C while on the image plane) by referring to the prime meridian 13, or the mapping domain 13' of the prime meridian 13 in FIG. 1B. The azimuthal distances of the incident rays laid on the same radius of the imageable area 1, or in space on the same azimuthal plane (like the sector determined by the arc C'D'F' and two spherical radii) are postulated invariant, like points D, E, F corresponding to points D', E'F' in FIGS. 1A and 1B.

In addition to the specific projection mechanism, the image-based algorithm furthermade several basic postulates: first, the imageable area 1 is an oval or a circle and the intersection of the major axis 11 and minor axis 12 situates the principal point, which is cast by the optical axis 21 shown in FIG. 1B; second, the boundary of the image is projected by the light rays of $\alpha=\pi/2$; third, $\alpha$ and $\rho$ are linear related, wherein $\rho$, termed a principal distance, is the length between an imaged point (like the point A) and the principal point (the point C). For example, the value of $\alpha$ at the point A is $\pi/4$ since it is located at the middle of the image radius, and therefore, the sight ray of $\alpha=\pi/4$ indicates its corresponding point A' in FIG. 1B; it is the same with point C and C', point D and D', point E and E', etc. An imaged point can be denoted as (u, v) in a Cartesian coordinate system or as ($\rho$, $\beta$) in a polar coordinate system while taking the principal point as the origin.

Although the mapping mechanism was not really put on discussion in the algorithm, it is actually the equidistant projection (EDP) whose function is $\rho=k\alpha$ where k is a constant and is the focal length constant if the FOV is exactly 180 degrees (totally simplified as EDP $\pi$ hereinafter); in fact, the EDP $\pi$ is the basic postulate in the image-based algorithm. The focal length constant can be accordingly obtained by dividing the radius of the imageable area 1 with $\pi/2$.

Based on those postulates, the planar coordinates (u, v) on the imageable area 1 can be easily related to the spatial angles ($\alpha$, $\beta$) of the corresponding incident rays. In light of the EDP mapping properties, an imaged point can be treated as a datum axis to turn into a transformed image without any further parameters needed. The U.S. Pat. No. 5,185,667 accordingly developed a technology to present FIS images in a hemispherical field of view (180 degrees by 360 degrees). This technology has been applied in endoscopy, surveillance and remote control as disclosed in U.S. Pat. Nos. 5,313,306, 5,359,363 and 5,384,588. However, the focal length constant was not included in discussion in the above researches.

Major parts of the mentioned image-based postulates, however, are unrealistic because many essential factors or variations have not been taken into consideration. First, there are several possible natural projection functions of the FIS and various probable ranges of the FOV, shown in FIG. 2; wherein the often-seen postulated EDP $\pi$ is just one special case so it is unreasonable to lock all the projection geometries on the EDP π. From the curves in FIG. 2, the differences are obviously increasing along the growing zenithal distances respectively between the EDP and the other two projection functions: the stereographic projection, formulized as $\rho=2f \times \tan(\alpha/2)$, and the orthographic projection, formulized as $\rho=f \times \sin \alpha$. Second, the projection π is doubtful and difficult to evaluate since the shape of the imageable area 1 is always presented as a circle no matter what the angular scale of the FOV is. A third factor concerns the errors caused in locating the image border. The radial decay of the radiometric response is an unavoidable phenomenon in a lens, especially when dealing with a larger FOV. This property will induce a radial decay on the image intensity, especially occurring with some simple lenses, so that the real boundary is extremely hard to set in the bordering effect. Consequently, the simple image-based algorithm is possessed of not only modeling errors but also practical limitations while deducing the optical parameters, so that the situated principal point could be unstable and the modeling ends up with a low accuracy.

Moreover, Margaret M. Fleck [Perspective Projection: The Wrong Image Model, 1994] demonstrated that the projection mechanisms of lenses hardly fit in with the ideal models in the whole angular range in practice; otherwise, optics engineers could develop lenses with special projection functions, such as the fovea lens, in light of the different requirements from applications. Thus, imposing the postulate of the EDP π on all FIS is extremely forced.

It is obvious that the related art didn't probe into the projection function of the FIS and didn't locate the border accurately. It resulted in a low spatial confidence while processing the image, and also kept the applications from advanced development. The present invention will carefully look into this subject and formulate a camera-parameterized procedure out of ideal image-based postulates so as to precisely obtain the optical parameters and to exactly transform FIS images on the basis of the obtained parameters. Thus, the advanced applications can also be achieved accordingly.

SUMMARY OF THE INVENTION

In view of the foregoing, the object of this invention is to solve the problems of fisheye-camera images by the precise optical parameters from the parameterized FIS so as to transform images into advantageous formats, such as the ones suitable for human visual perception, for being applied in image systems.

In accordance with the object described above, the present invention provides a method for presenting fisheye-camera images, wherein the portion about parameterizing the fisheye lens is referred to in the U.S. application Ser. No. 09/981,942. An absolutely located calibration target with a concentric and symmetric geometric test pattern is utilized to locate the principal point and set the position of the optical axis. The viewpoint (VP) of the fisheye camera (also termed the spatial optical center) will subsequently be fixed on the optical axis and meanwhile, the focal length constant is figured out, and the projection function will accordingly be categorized during the parameterizing procedure. Hence, standing within the given optical parameters—including the principal point, the viewpoint and the projection function with the focal length constant embedded inside—FIS images can be properly transformed for advanced applications.

A two-step modeling method is developed to describe the image-forming mechanism of a FIS as well as the transformation procedure. The spatial incident rays first perspectively map onto a virtual sphere, centered at the VP with a radius of the focal length constant. After this normalization phase, various map-projection techniques in cartography are adopted to interpret the projection mechanisms of different fisheye cameras in light of their projection functions. Inversely, the FIS images also can be transformed back to the unit sphere mentioned and coded each by a pair of angular distances of (α, β) so as to further present the FIS images on the desired ways.

The method disclosed by the invention is not only simple but also low-cost because the required optical parameters have been ensured after the parameterization. The method is therefore suitable for various kinds of fisheye cameras and capable of speedily transforming and presenting the fisheye-camera images.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below of illustrations only, and thus are not limitative of the present invention, and wherein.

DETAILED DESCRIPTION OF THE INVENTION

The fisheye-camera image is possessed of a severe barrel deformation comparing with the distortions by a normal camera. The distortion is center-symmetric on the image plane and axis-symmetric in the projecting space. This phenomenon is well known to those skilled in the related art. However, the incident rays from subjects will logically converge onto a unique spatial optical center, and then divergently image on the image plane.

Considering the geometrical condition, a symmetric image can be obtained by a planar drawing capable of representing a spatial-symmetric geometrical arrangement. Therefore, the optical axis and the principal point are determinable when the symmetric image has been absolutely referred to by means of adjusting the test fisheye camera (also termed as the fisheye image sensor, simplified as the FIS hereinafter). The obtained object-to-image scale data is subsequently based to locate the spatial optical center (also termed viewpoint, simplified as VP) and derive the focal length constant. Wherein the technology about parameterizing the fisheye lens is referring to the prior U.S. application Ser. No. 09/981,942.

A two-step modeling method aiming at the FIS is therefore provided by integrating the well-developed disciplines, including the multicollimator metrology and cartography, into the invention to systematically describe the projection mechanism of the FIS.

The aged multicollimator metrology was employed to calibrate large-scale aerial convex lenses. It utilized an arc-laid array composed of independent point-light sources with accurate alignment to generate a bundle of light rays converging at a preset point which is supposed to be the optical center of the test FIS. Each light ray from the point-light sources simulates an incident ray from infinity with a known zenithal distance of $\alpha$, which is the angle extending from the optical axis 21 to the incident ray. Consequently, the respective image scale is accurately metered. Namely, the ray-tracing in the system can be absolutely scaled. This layout capable of absolutely fitting the projection behavior is a general method for describing the behavior of any lenses. The metrology is based to describe the projection mechanism of the invention.

Figure 3:
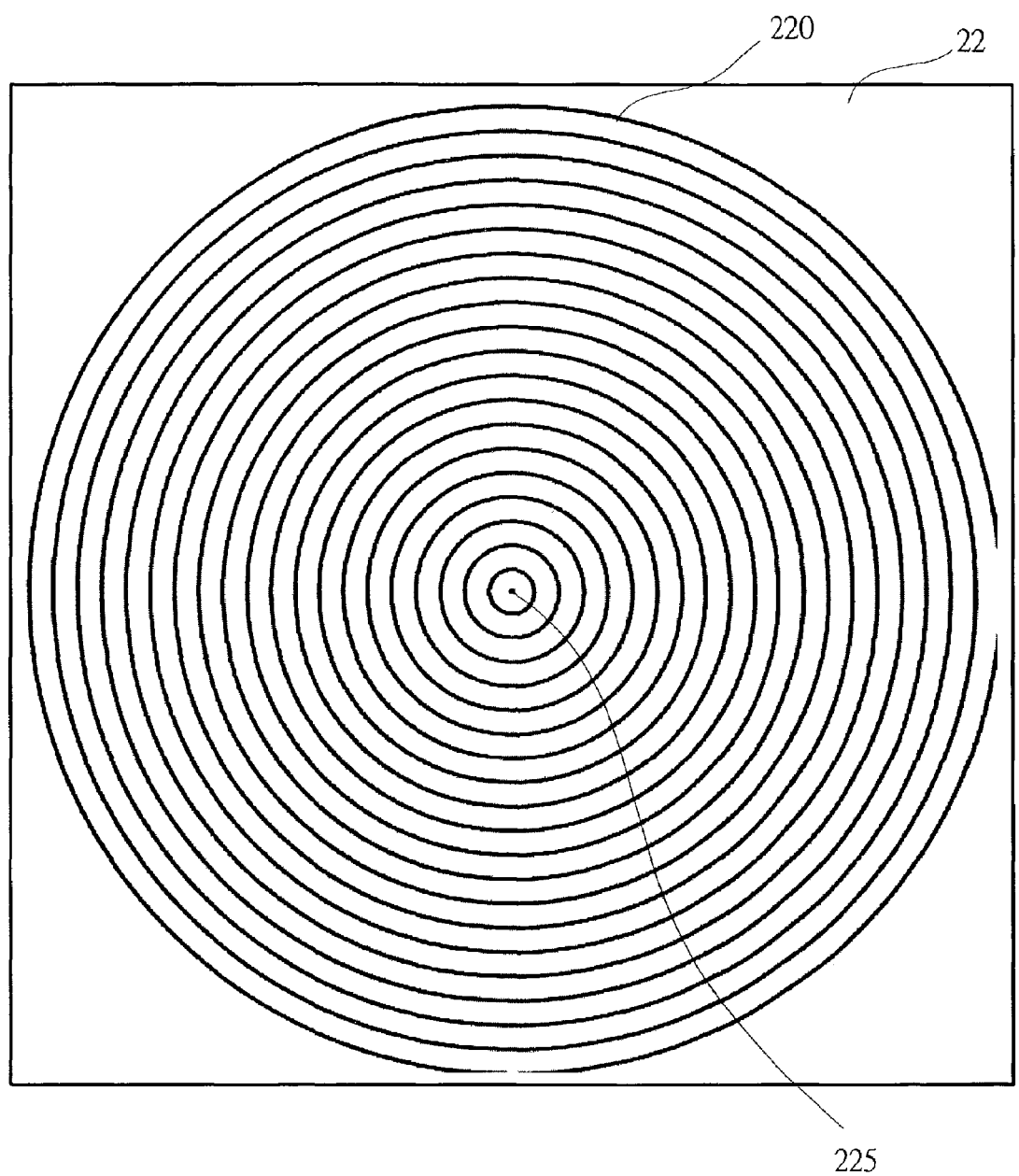
FIG. 3 shows an optimum embodiment of the physical concentric test pattern (PCT) applied in the invention.

The accurate arc mechanism on the multicollimator is too sophisticated to be realized in normal labs. However, a planar drawing is easier to achieve. Referring to FIG. 3, the calibration target 22 is therefore used in this invention in order to substitute for the multicollimator, and a physical concentric test pattern (PCT) 220 is provided on the calibration target 22 while parameterizing a FIS.

Figure 1A:
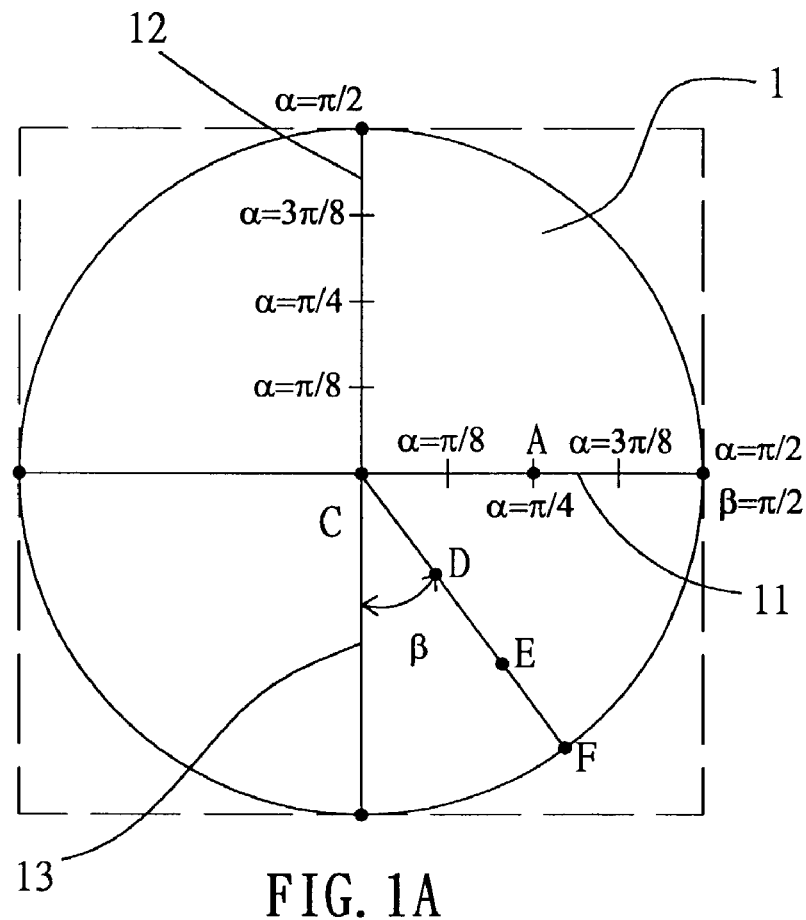
FIGS. 1A and 1B show the schematic view of an image-based algorithm aimed at EDP π of the fisheye-camera images in the related art.
Figure 1B:
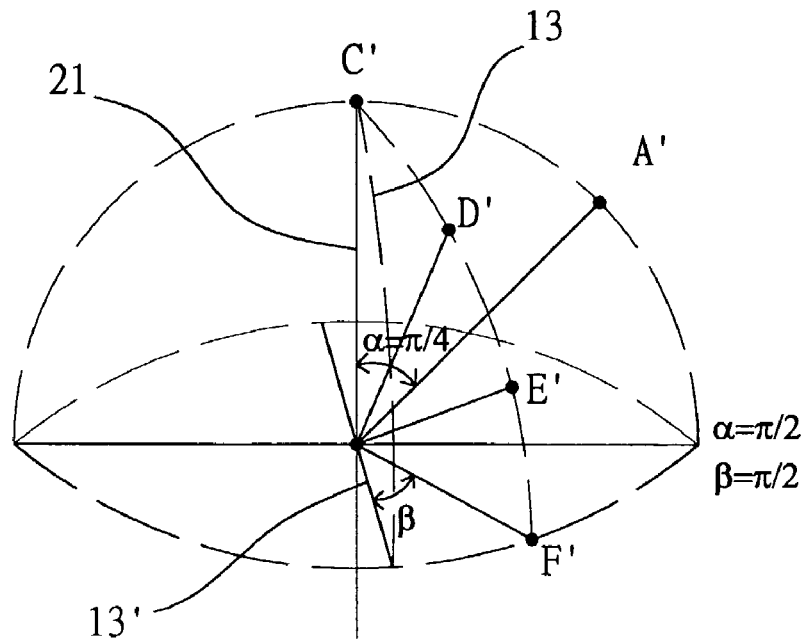
Figure 2:
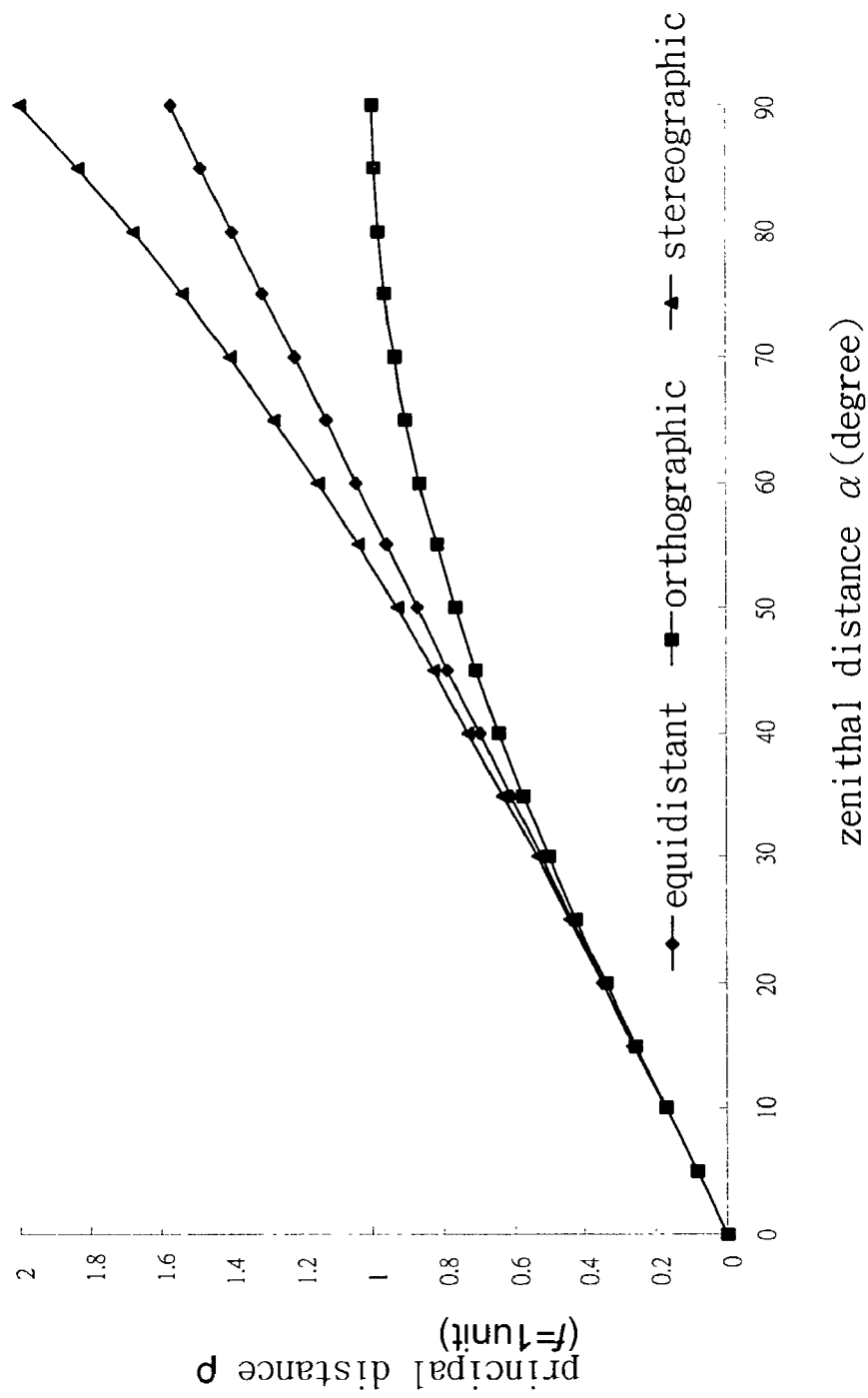
FIG. 2 sketches three typical projection functions of the fisheye lens.
Figure 4:
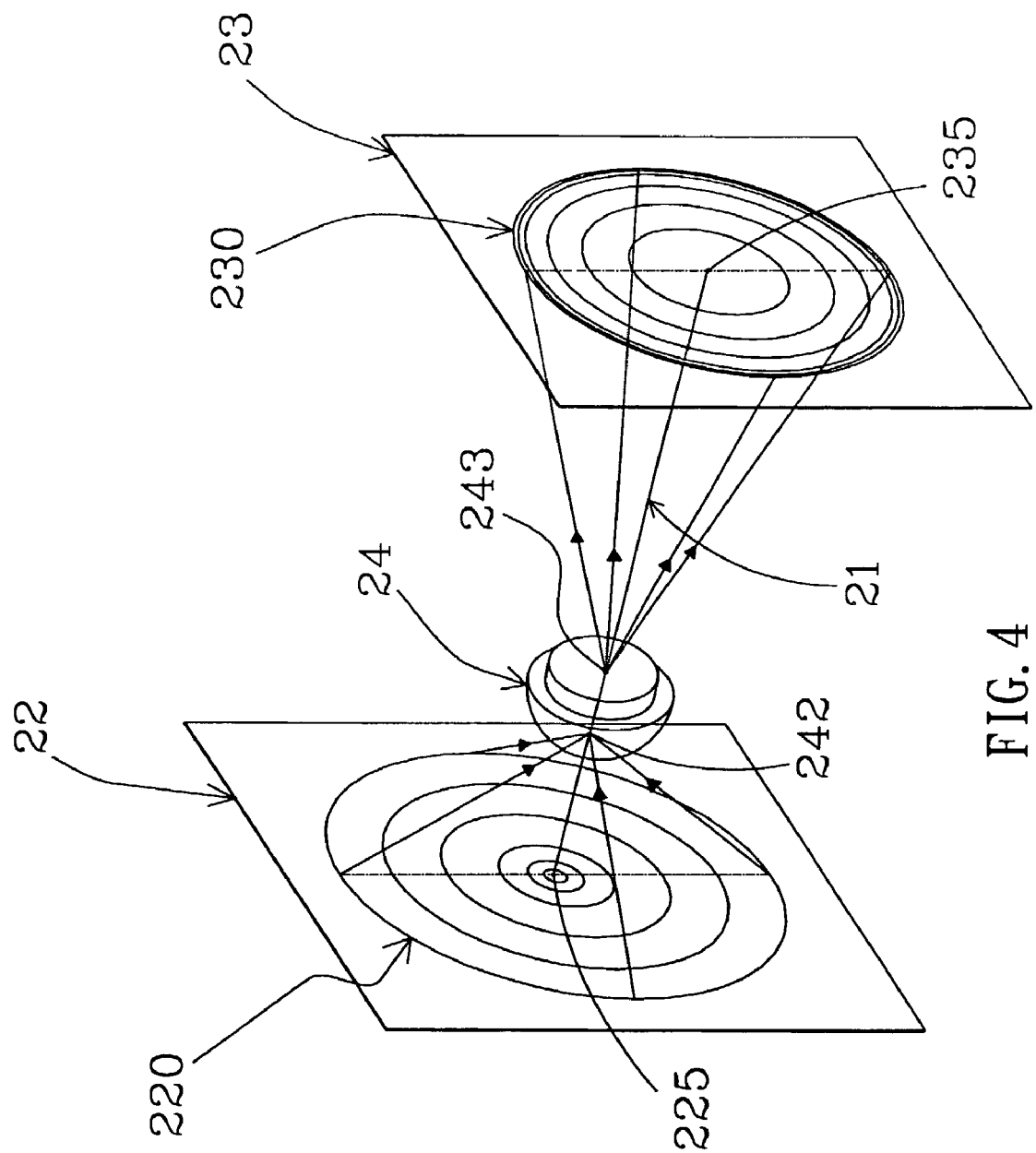
FIG. 4 cubically shows the 3-D optical paths between the PCT and the FIS in the invention.
Figure 5:
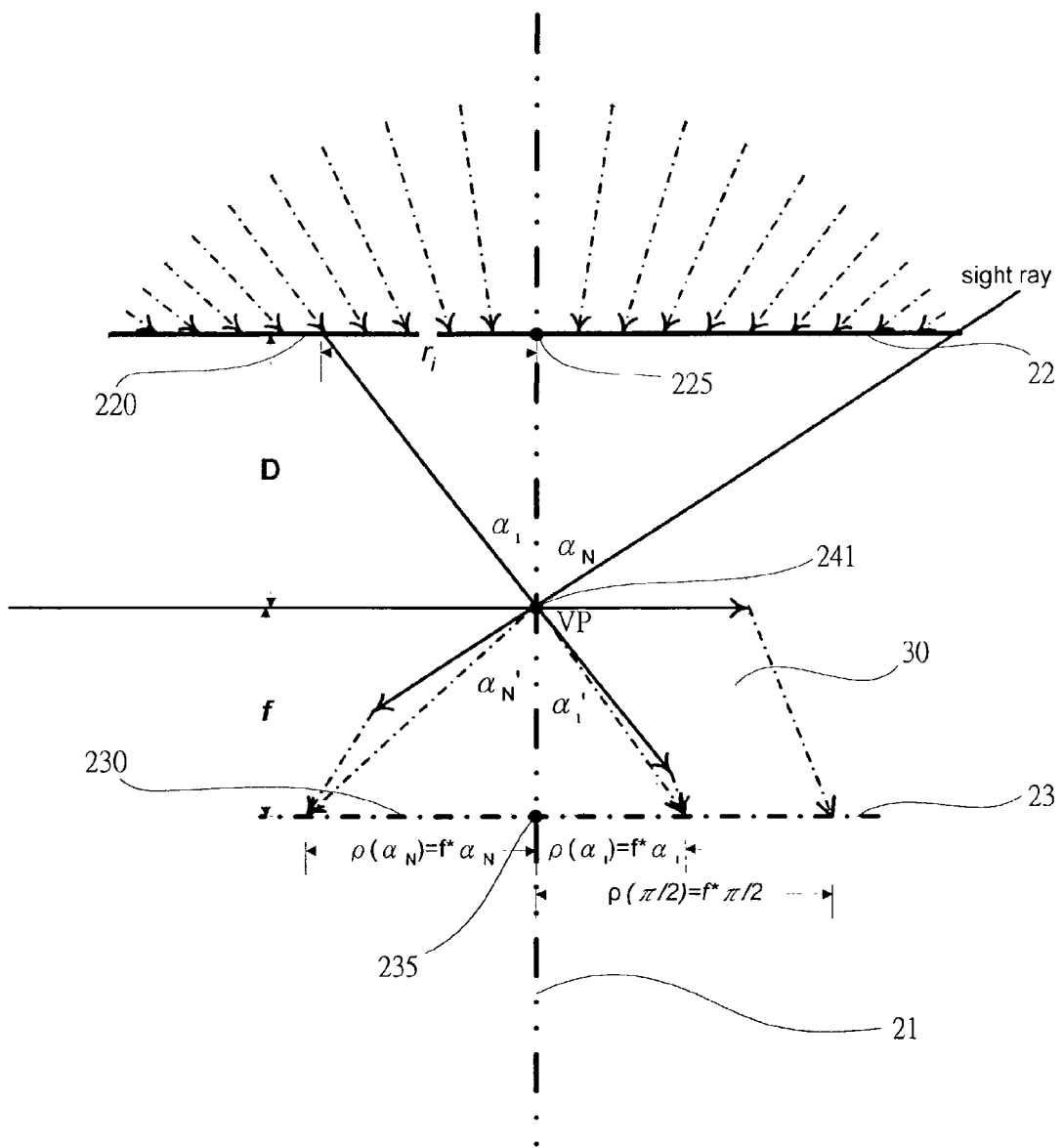
FIG. 5 shows the multi-collimated optical paths achieved by an aligned PCT and the projecting relationship between the large and small virtual spheres (taking the EDP as an example)

FIG. 4 shows the spatial optical projecting paths from the PCT 220 to the FIS, which is equivalently represented by the combination of the fisheye lens 24 and the image plane 23 in unison. The calibration target 22 is immersed in the field of view (FOV) of the FIS. If the obtained projecting behavior matches one of the typical projection curves shown in FIG. 2, the collimating mechanism of the incident rays is essentially achieved; namely, the incident rays will converge at a logical optical center (also called the front nodal point, FNP) 242 and diverge onto the image plane 23 (or the optical sensor) from the back nodal point (BNP) 243. The FNP 242 and BNP 243 are the referred points for the two distinct spaces delimiting the projecting behaviors inside and outside the FIS. Hence, the distance between them is arbitrary while modeling the system. The two nodal pointes 242,243 can be postulated as merging at a single virtual nodal point, that is the viewpoint (VP) 241 shown in FIG. 5. For brevity, the geodetic terms are adapted in describing the modeling hereinafter. Referring to the optical axis 21 as the pole axis, the ray-tracing in two azimuthal planes of a $\pi$ difference on the azimuthal distance $\beta$ is equivalently shown in FIG. 5, which takes the equidistant projection (EDP) as an example. All sight rays on the same azimuthal plane are possessed of invariant azimuthal distances $\beta$, which are the angles surrounding the optical axis 21 (or the principal point 235 while on the image plane 23) by referring to the prime meridian 13, or the mapping domain 13' of the prime meridian 13 shown in FIGS. 1A and 1B. This figure is also used to express the cubical geometry since the projection is axially symmetric.

Two assistant virtual spheres, the large and the small, are brought out for modeling and explaining the invented methodology. The plane containing the PCT 220 is normally scant to the large sphere with height D while the most external concentric circle of the PCT 220 is physically and intrinsically aligned as a secant circle on the large sphere if the optical axis 21 has been adjusted to perpendicularly pass through the center 225 of the PCT 220. The sight rays induced by the PCT 220 will perpendicularly penetrate the surface of the small sphere 30 and further gather up at the spherical center (also the VP 241), which defines the origin of the spherical coordinate system. Therefore, symmetric conical light beams constructed by each concentric circle on the PCT 220 will logically converge at the optical center. The cubical skeletons are revealed in detail in FIG. 4.

The sight rays will form the corresponding imaged contours 230 on the image plane 23 after they are logically refracted by and leave from the optical center 241 of the fisheye lens 24. Based on the spatially axis-symmetric characteristic mentioned, an imaged concentric target (ICT) 230 will be consequently presented and is centered at the principal point 235. Hence, in the apparatus setup, the PCT 220 is fixed at an absolute position and the camera is properly adjusted until an ICT 230 is reached so as to collinearly align the pattern center 225 and the principal point 235. Accordingly, the optical axis 21 can be absolutely situated. This step in making the optical axis 21 traceable is a breakthrough in parameterizing a FIS.

There are many kinds of the test pattern 220 available in the invention, not just the concentric circles shown in FIG. 3. It will be a better embodiment for the test pattern 220 composed of concentric-and-symmetric geometric figures. Therefore, the concentric rectangles, the concentric triangles or the concentric hexagons are all applicable in the invention in addition to the concentric circles. Even the combination of any number of circles, rectangles, triangles and/or polygons will be a possible embodiment of the test pattern 220 in the invention.

Figure 6:
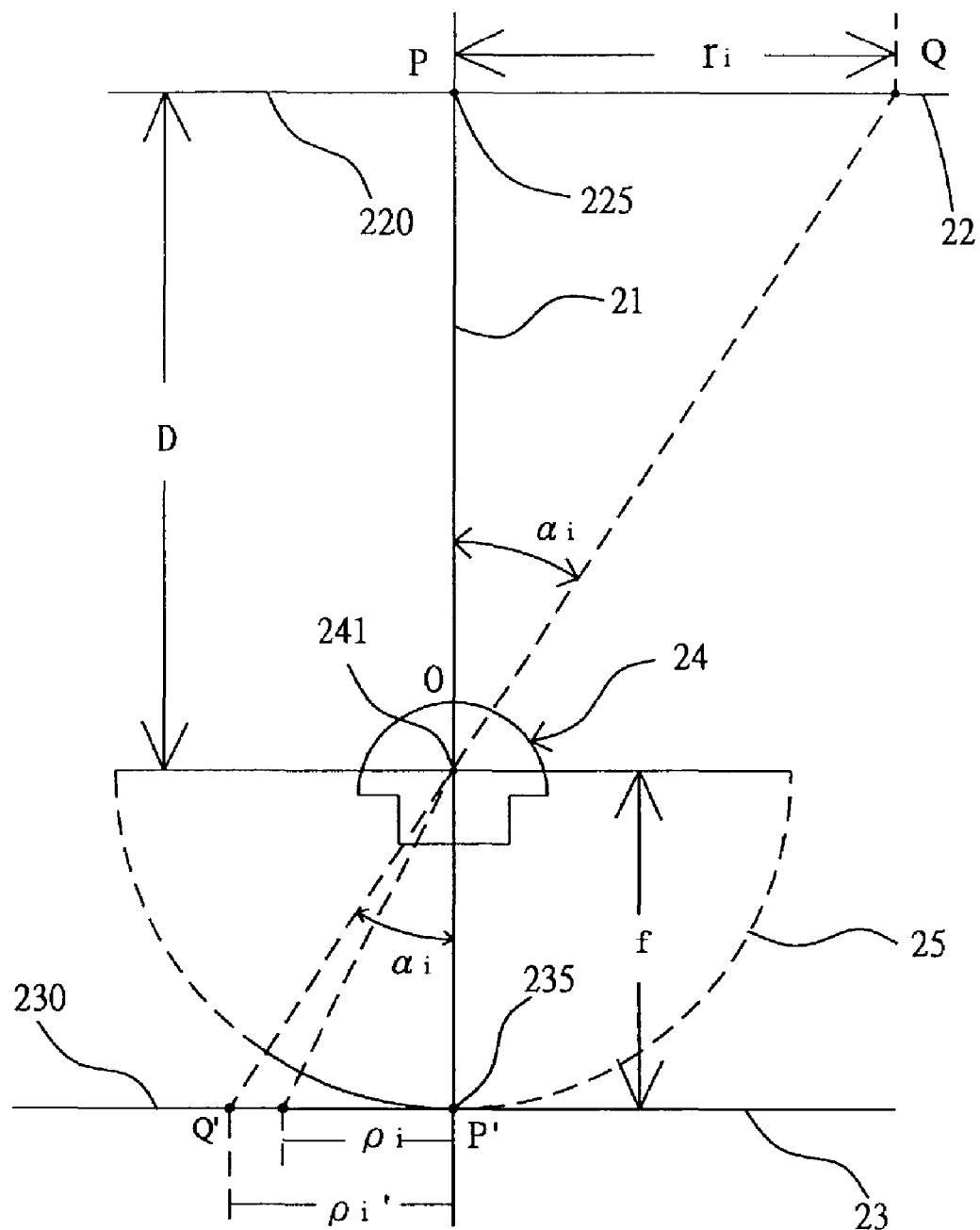
FIG. 6 shows the optical paths for fixing the viewpoint and illustrates the normal azimuthal projection used to fit the FIS image to the rectilinear perspective projection (taking the EDP as an example)

After the exposure of the optical axis 21, the VP 241 must be on the optical axis 21 in light of the optics theory. It means that the possible range of the viewpoint 241 is shrunk to quite a limited scope. The method of trial-and-error is therefore employed to find out the exact spot of the VP 241 and then figure out the focal length constant 21 of the FIS. Here the projection function of the test FIS is postulated as the EDP and is actually the embodiment in the invention; however, the manipulating procedure also works on other types of projection functions. Referring to FIG. 6, if a pinpoint on the optical axis 21 is set as the VP 241, the zenithal distance $\alpha_i$ defined by the $i^{th}$ concentric circle is therefore determined. Combined with the $\rho_i$, an $f_i$ for the concentric circle i can further be figured out by dividing $\rho_i$ with $\alpha_i$.

All the values of the calculated $f_i$ from the different concentric circles are constant while the projective behavior of the camera totally fits in with the assumed EDP model; otherwise, take another projection model or limit the zenithal range for one more modeling test until reaching a successfully matching level.

In the embodiment, the test PCT 220 was set as a planar drawing composed of twenty concentric circles surrounding a central blob. A constant 5-mm radial distance separates the adjacent concentric circles. For descriptive purposes, the coordinate origin (0,0,0) is set at the VP 241, and the Z-axis is regarded as the optical axis 21, denoted as (0,0,z) where z is a real number. The object distance D, the length between VP 241 and the PCT 220, is the next investigative target.

Since both $\rho_i$ and $\alpha_i$ are functions of D, they are respectively represented as $\rho_i(D)$ and $\alpha_i(D)$. According to the projection function, $\pi_i(D)=f\alpha_i(D)$, where i=1~N and N is the number of imaged contours 230 capable of being processed, if the $N^{th}$ imaged contour $\rho_N(D)=\eta\alpha_N(D)$ is taken as the common reference, the relation with the $i^{th}$ imaged contour is given as:

$$\rho_i(D)/\rho_N(D)-\alpha_i(D)/\alpha_N(D)=0 \quad (1)$$

However, the object distance D cannot be foreseen in advance because the VP 241 is not yet settled down. A free point (0, 0, z) therefore replaces (0,0,D) to equate the equation (1); a difference is given by:

$$e_i(z)=\rho_i(D)/\rho_N(D)-\alpha_i(z)/\alpha_N(z) \quad (2)$$

Scanning along the optical axis 21, the object distance D can be fixed at the minimum of $e_i(z)$ according to the equation (2); the exact spot of the VP 241 is consequently fixed in the meantime.

However, the equation (2) just refers to two selected concentric circles. In order to investigate the overall FOV and consider the nonlinear radial extension from each imaged contour, a weight function is defined as:

$$w_i(D)=(\rho_i(D)-\rho_{i-1}(D))/\rho_N(D) \quad (3)$$

where $\rho_0(D)$ is a null value and is treated as the radius of the principal point 235. This function will deal fairly with all effective contours on the image plane 23. Thus, the matching error profile with the overall evaluation along the optical axis 21 is:

$$\varepsilon(z) = \sum_{i=1}^{N} \text{abs}(e_i(z) \times w_i(D)) \quad (4)$$

where z represents the distance of a free point from the PCT 220 on the optical axis 21. The VP 241 is located where the $\varepsilon(z)$ is minimum, or null. To obtain the focal length constant $f$, the measured $\rho_i(D)$ and the respective $\alpha_i(D)$ are based to get:

$$f(D) = \sum_{i=1}^{N} f_i(D) \times w_i(D) \quad (5)$$

where $f_i(D)=\rho_i(D)/\alpha_i(D)$. The $f(D)$ and the $f_i(D)$ should be equal to the inherent focal length constant $f$ of the FIS while the postulated projection function is exact, no error occurs in measurement and the D value is correctly inferred.

Put into practice, the descriptive-statistic standard deviation of all $f_i(D)$ can be the basis to evaluate the accuracy of the postulated projection model. Namely, the following equation can qualify the fitness of the postulated projection function:

$$\sigma(D) = \left(\sum_{i=1}^{N} (f_i(D) - f(D))^2\right) / (N-1) \quad (6)$$

Figure 7:
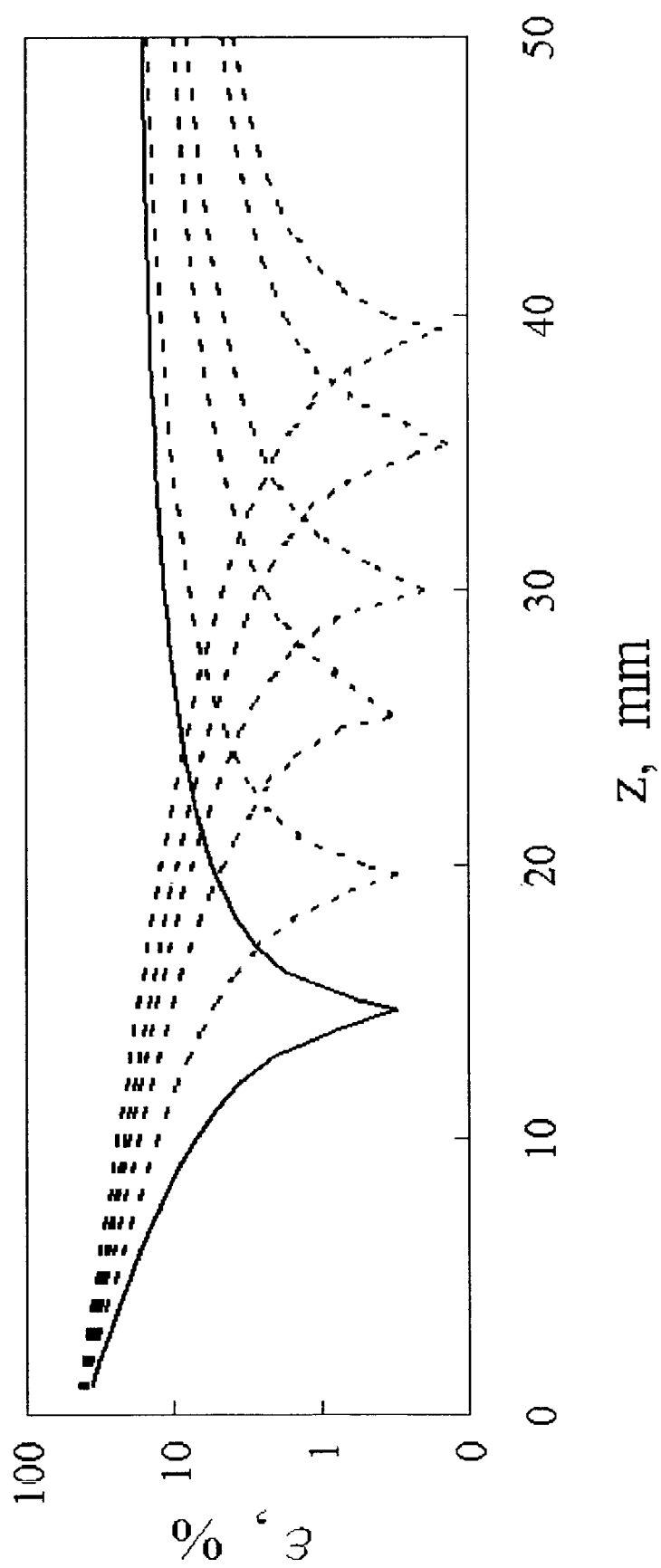
FIG. 7 shows the approaching curves for seeking the viewpoint in practical apparatus.

Referring to FIG. 7, it shows the matching profiles based on the equation (4) while deriving the object distance D along the Z-axis. The test FIS is composed of a board camera body (Type BV-7112, by Appro Tech. Co., Taiwan) and a fisheye lens having the focal length of 1.78 mm and the diagonal FOV of 170 degrees (Type DW9813, by Daiwon Optical Co., Korea). The solid line in FIG. 7 is the profile of the matching errors treated as the first test in which the inferred object distance D is 14.70 mm.

For advanced evaluation, the calibration target 22 is separately moved five times along the optical axis 21, covering 5 mm each time. Taking the first test (dD=0.0 mm) as the reference, the increasing offsets are 5 mm (dD=5.0), 10 mm (dD=10.0), 15 mm (dD=15.0), 20 mm (dD=20.0) and 25 mm (dD=25.0) respectively. The same deriving procedure described above is undergone again on the five more tests. Their respective error profiles are presented as dashed lines from left to right in FIG. 7. These curves reveal obvious minimums for locating their inferred object distances. Accordingly, the test results are respectively shown in Table 1.

TABLE 1 the parameters and results of the tests in the invention

| dD | 0.0 | 5.0 | 10.0 | 15.0 | 20.0 | 25.0 |
|---|---|---|---|---|---|---|
| D | 14.70 | 19.63 | 25.18 | 30.08 | 35.27 | 39.52 |
| f (D) | 1.805 | 1.788 | 1.827 | 1.796 | 1.798 | 1.784 |
| σ (D) | 0.005 | 0.002 | 0.0091 | 0.0058 | 0.0062 | 0.0052 |

(unit: mm)

Reviewing Table 1, the first row denotes the six offsets of the calibration target 22 while taking the first one as the reference; row two shows the inferred object distances; the third row lists the respective focal length constants; and the last row indexes the goodness of fitting. The obtained data highlights the accuracy and precision thus attainable. About evaluation, the focal length constant $f$ is the only parameter that can be read from the vendor's datasheet but its efficacy was not documented. The intense convergences of the inferred values, $f(D)\pm\sigma(D)$, underscore the reliability of this declared focal length.

In addition, the other two projection functions are also put to tests for picking up relatively the most minimum group of values of $\varepsilon(z)$ among the three kinds of postulated projection functions. Namely, the stereographic projection ($\rho=2f\times\tan(\alpha/2)$) and the orthographic projection ($\rho=f\times\sin\alpha$) are based to obtain their parameter data similar to Table 1. However, the distinguishable deviations of the inferred object distances reveal that the test lens has departed from the two models. It concludes that the test lens is accordingly categorized as the one nearest the EDP type. However, the method for parameterizing cameras is not limited to the FIS complying with the EDP or with a projection π.

The camera-parameterizing method described above complies completely with the optics of cameras. The problems of the uncertain projection π of the FOV can be ignored in the present invention while transforming and presenting the images starts from the principal point 235 and moves outwards to determine the investigated area of the image. It means that users can define the interesting areas and select them for processing; namely, the problem of fixing the boundaries is also eliminated. In some cases, users can shorten the sampling area to meet the required accuracy.

As shown here the necessary optical parameters for transforming the fisheye-camera images have been prepared ready from the parameterizing method.

Figure 8:
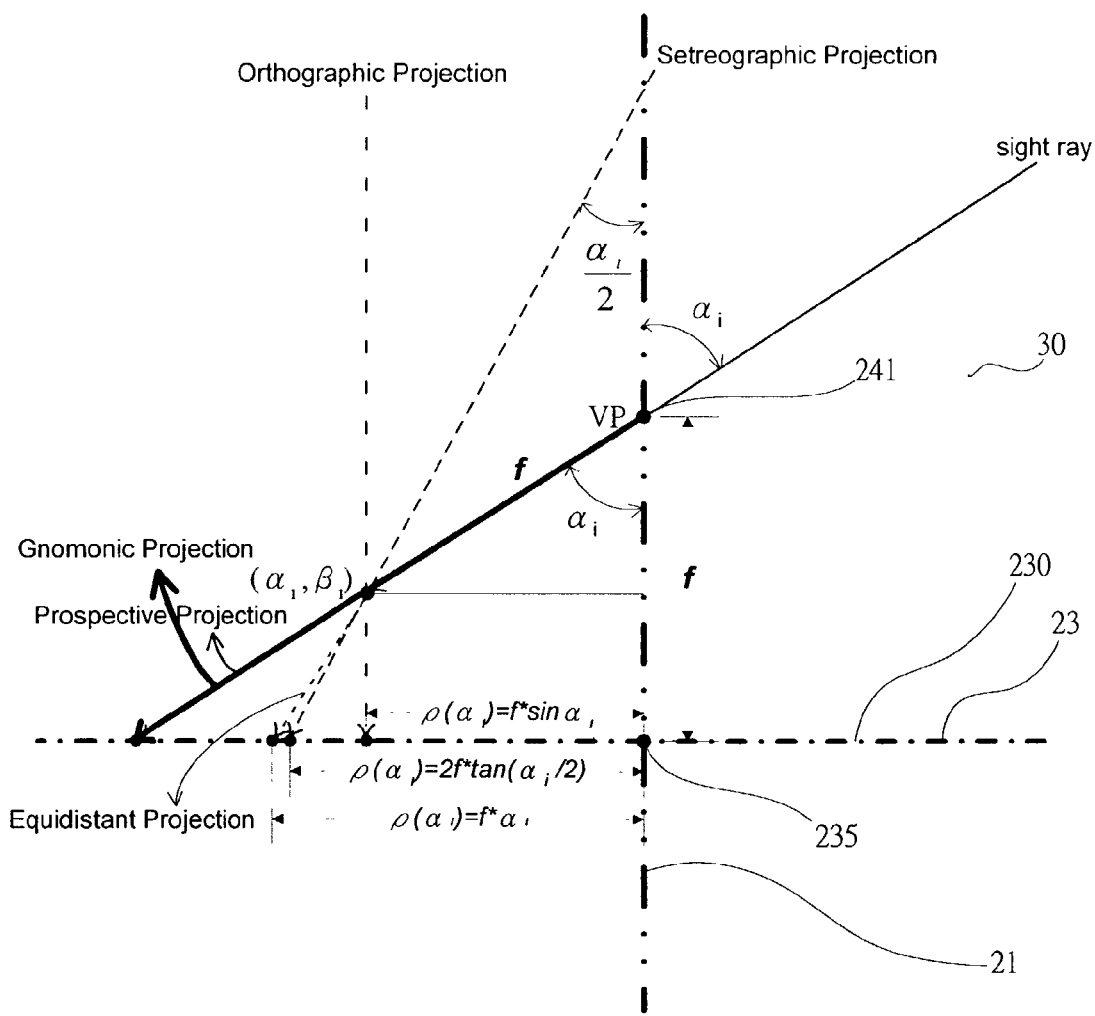
FIG. 8 shows the optical paths in logical deployment in the two-step method by highlighting a part of FIG. 5.

Referring to FIG. 5 again, it can be viewed as placing the VP 241 of a FIS at the center of a transparent tellurion and the optical axis 21 is aligned with the two poles of the earth. Since the three typical projection functions in FIG. 2 can be geometrically related to the small virtual sphere 30 regarded as the globe in cartography, the mapping mechanism of the FIS is logically divided into two steps. First, FIG. 8 is referred to, which linearly projects the sight rays through the VP 241 and onto the surface of the small sphere 30. The rays of any zenithal distance, even larger than π, can be equivalently mapped in the first-step logic. Second, the exact mirrored geometry on the small sphere 30 is further projected onto the image plane 23 according to a specific map projection method. For instance, the sine function is used for the orthographic lens possessed of the image-forming mechanism of $\rho=f*\sin(\alpha)$, and the function of $\rho=2f*\tan(\alpha/2)$ is the stereographic projection function, where $\rho$ is the principal distance, $\alpha$ the zenithal distance and $f$ the focal length constant. Similarly, the arc lengths accordingly determine the principal distances in the case of the EDP lens.

There are advantages to interpret the image projections this way. The first step is a simple rectilinear mapping by pivoting on the VP 241, so that the well-developed processing techniques with respect to the perspective projection can be directly adopted. Namely, the points on the small sphere 30 can straightforwardly define the respectively corresponding sight rays in the object space. This mechanism also provides a unique VP 241 in logic to make cubical applications practicable while the prior researches all declared that a single VP 241 does not exist in the FIS. It is interesting that the second phase exactly fits in with the procedure of the forward map projection in cartography while it transforms 3D spherical coordinates into 2D Cartesian coordinates. Cartography is a well-developed discipline in transforming the global geometry into flat maps. The second step also implies that the inverse procedure, termed as the inverse map projection in cartography, enables every imaged point denoted as (u, v) on the image plane 23 to be inversely normalized on the small sphere 30 by the spatial angular distances of ($\alpha$, $\beta$) termed as a normalized imaged point. On the basis of this small sphere 30, the normalized imaged points on the small sphere 30 can be respectively transformed into the corresponding transformed imaged points again and again by different kinds of map projections. Therefore, presenting the FIS images for particular functions, such as the approach of human visual perception, the video data encryption, and the image compression/transformation, becomes extremely easy just by switching among different but proper map projections. Integrating cartography into the technologies of presenting the FIS images is a great innovative idea in the invention.

One normalized imaged point ($\alpha$, $\beta$) actually represents one unique corresponding sight ray in space. For the functions of zoom-in or zoom-out, the radius of the small sphere 30 is further varied as the third dimension, that is, turning ($\alpha$, $\beta$) into ($\alpha$, $\beta$, R), where R is the radius of the small sphere 30.

There are various cartographic techniques of presenting maps for different applications. As for transforming a map, four elements are considered: the light-source position, the projection surface, the orientation of the projection surface and the tangency of the projection surface. The projection surface could be a cylinder, a cone or a plane; the orientation of the projection surface may be normal (zenithal/azimuthal), transverse or oblique. In view of the light-source position, they are classified as the gnomonic projection placing the light source at the center of the globe, the stereographic projection placing the light source at the antipode of the point of tangency and the orthographic projection placing the light source an infinite distance from the projection surface so that the results are parallel light rays, shown in FIG. 8. As for the tangency of the projection surface, the tangent projection and the secant projection are considered. These map projections have been well developed in the related art, so the detailed contents will not be further discussed in the present invention and please refer to the text book 〖Element of Cartography, Robinson, Arthur, et. al., John Wiley and Sons, Inc., NY, 6$^{th}$ ed., 1996, page 39 to 111〗 instead. However, various combinations constructed by the four elements are based to present the images of the FIS for practical requirements. For instance, the gnomonic normal projection places the light source at the global center and map information onto a planar projection surface tangent to the globe at the pole while the referred axis is the pole axis. It is worth noting that the gnomonic projection is exactly the prospective projection in view of taking the VP 241 as the pivot in camera systems.

Cartography declared that any map projections could not exactly dimension the whole global geometry except the specific line(s) or point(s). This statement also implies some properties in presenting images of the FIS. Namely, the physical skeleton of the imaged object can be morphologically recovered into some specific layouts. For example, the gnomonic normal projection can exactly recover a planar drawing placed perpendicular to the optical axis, and objects in similar cylindrical arrangements can also be got back to conforming the visual perception in a panorama by employing the gnomonic cylindrical projection. The examples of demonstrating the mentioned advantages will be introduced hereafter.

Figure 9A:
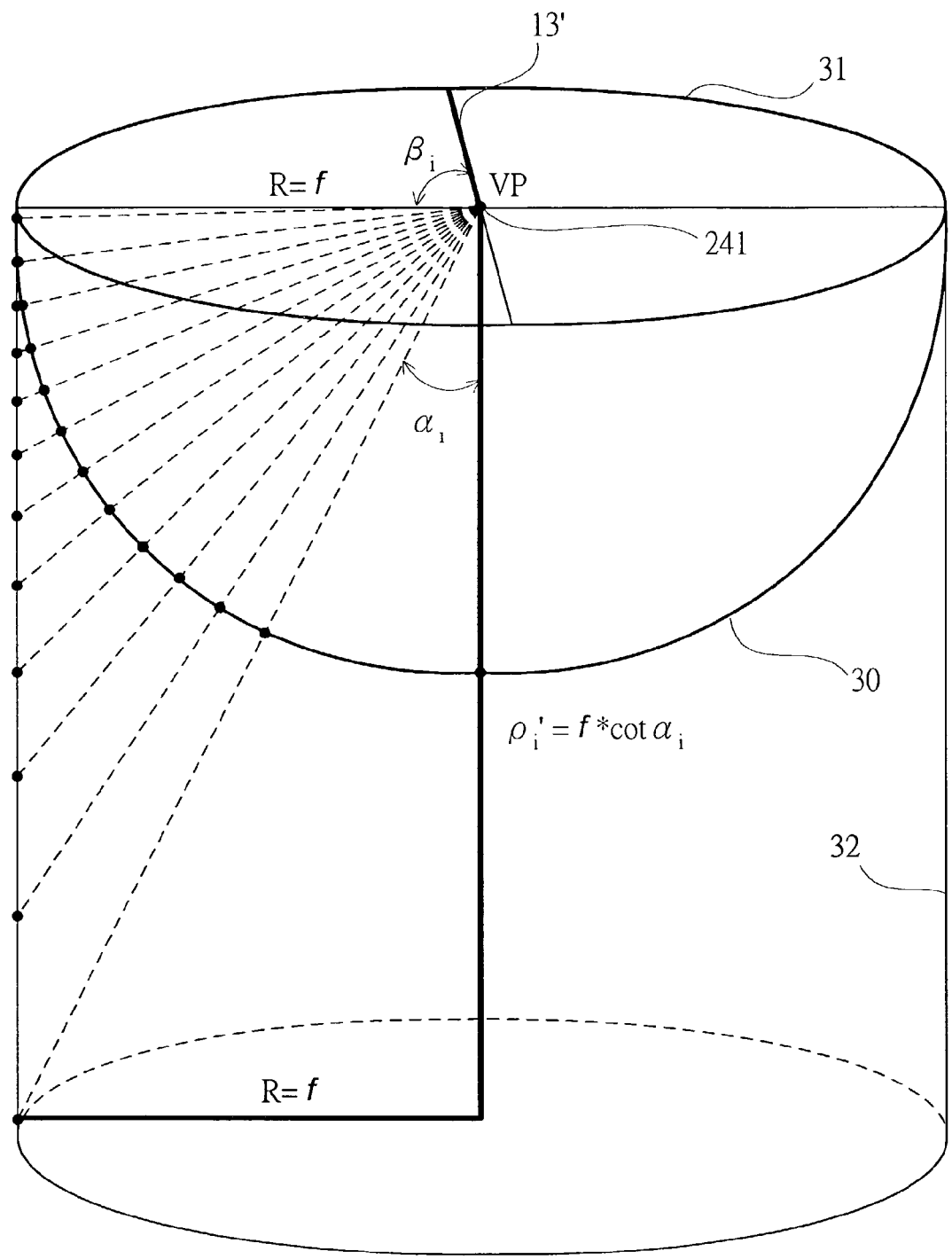
FIG. 9A shows a schematic view in transforming the fisheye-camera image into a panoramic view by means of the gnomonic cylindrical projection.

Since the morphologic fidelity of an object can be recovered through the precise optical parameters of the FIS and the original images can be transformed into various formats by all kinds of the map projections in cartography, the applications of this invention are abundant. The panorama may present a horizontal view meeting the common human visual perception in a specific immersed environment. With reference to FIG. 8 and FIG. 9A, the intensity, or color, of the imaged points ($u_i$, $v_i$) are first mapped to the small sphere 30 and coded as ($\alpha_i$, $\beta_i$); namely $I(\alpha_i, \beta_i, R)=I(u_i, v_i)$, where R is the radius of the small sphere 30 and varied depending on the chosen magnification of the transformed image. Consequently, the gnomonic cylindrical projection in cartography will project part of the global image onto a cylindrical surface 32. If the cylindrical surface 32 is tangent to the equator 31, the radial image segment on the hemisphere 30 (like the meridians on the globe) will be displayed as straight lines on the cylindrical surface 32.

A panoramic view is therefore achieved by unfolding the cylindrical projection surface 32 into a rectangular plane. In this aspect, every transformed imaged point is treated as one coordinate of (x, y) on the unfolded projection surface. The transformed image height $\rho_i'$, the Y-vector, is $\rho_i'=f*\cot(\alpha_i)=$ $f*\cot(\rho_i/f)$, where $f$ and $\rho_i$ have been defined previously. And the transformed image width, the X-vector, is the arc length subtending the azimuthal angular distance $\beta_i$ on the circumference of the small sphere 30; namely, the X-vector is equal to $\beta_i*R$. On this mapping basis, if the imaged contours are projected from standing objects paralleling to the optical axis 21, the corresponding ones on the transformed image will keep upright, too. Therefore, the skeleton of objects on the specific cylindrical surface 32 can be transformed without distortion; that is to say, the morphological fidelity can be totally recovered.

Figure 9B:
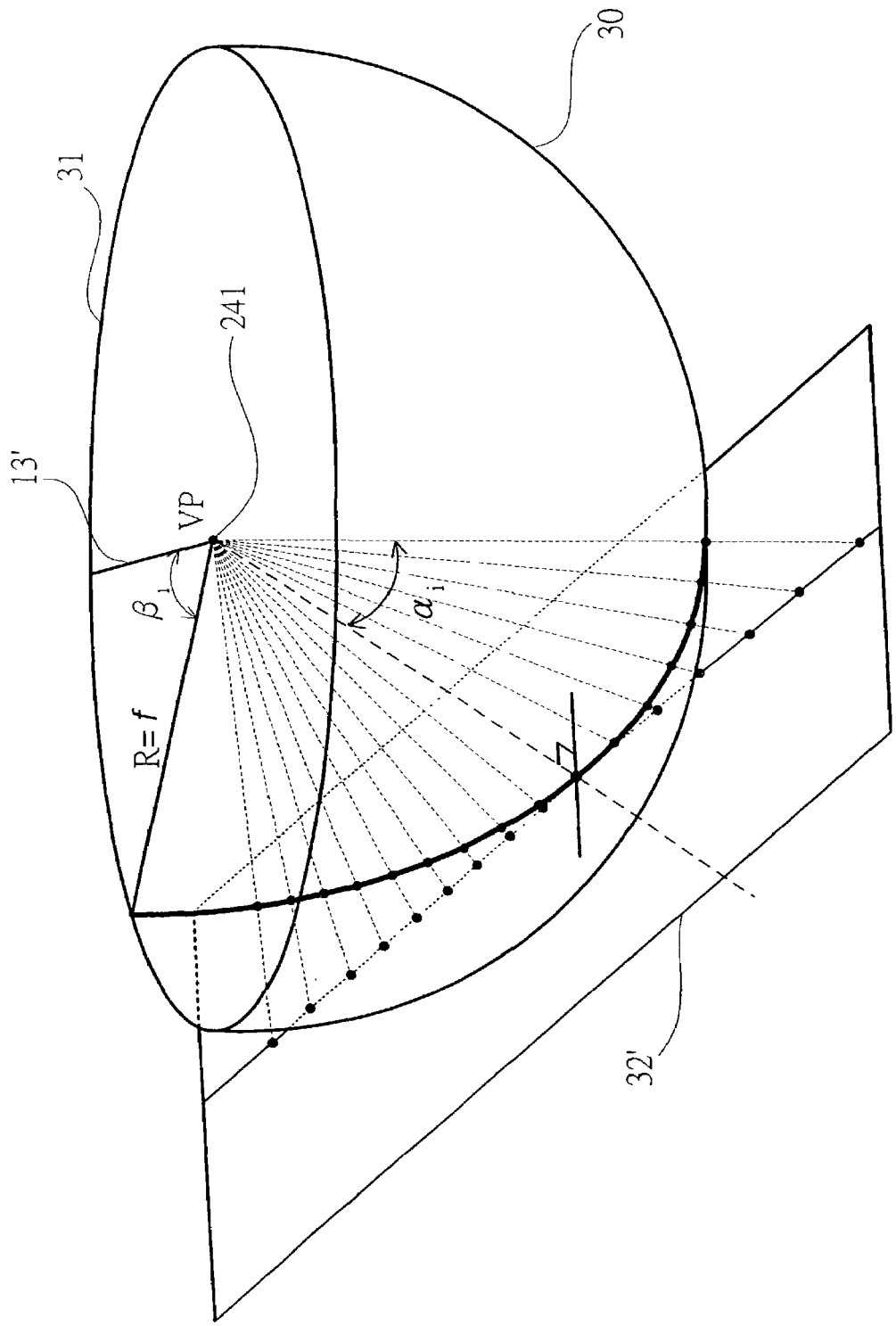
FIG. 9B shows a schematic view in transforming the fisheye-camera image into a perspective-corrected view by means of the gnomonic oblique projection.

Of course, if the projection surface 32 is not a cylindrical type, maybe a plane or a cone, the calculation of the X-Y vectors will be varied accordingly. Referring to FIG. 9B, it shows a planar projection surface 32' in an oblique orientation, which is actually the gnomonic oblique projection. It may be used to present some objects in special orientations or bring some transformative effects. The related transforming methods have been well developed in the related art, so the detailed contents will not be further discussed in the present invention.

This invention also works on the FIS images without the FOV of $\pi$. While expanding the panorama, or other kinds of transformed images, with morphologic fidelity, the X-Y vectors have to associate with each other. No matter whether the FOV is smaller or larger than $\pi$, the referred basis to scale the horizontal X-vector is still the dimension of the equator 31. For instance, if the available FOV for panoramic transformation is limited to 140 degrees, the Y-vector will be processed within 70 degrees of $\alpha$, but the horizontal X-vector must also refer to the spherical radius. For that reason, the invention has the advantage of recovering the morphologic fidelity due to the reliable focal length constant.

This above presenting method for the panorama, or other kinds of transformed images, is in common use in various types of lenses as long as the projection functions are given. For instance, if the projection function of the FIS is the stereographic or the orthographic projection, the respective reverse mappings from (u, v) to ($\alpha$, $\beta$) are still derivable according to their respectively projection functions.

The teleconference is a current digital media application in Internet. A couple of camera sets are usually used for implementing a "face-to-face" communication. However, a "table-to-table" meeting could be achieved by this invention. Suppose the attendees at a conference are sitting around a round table where a document is up for discussion. Many camera sets are needed to transmit the whole scene by the usual techniques, but only a FIS, which is hanging on the ceiling, is enough in this invention for the purpose. Due to the cylindrical trait in general, the people surrounding the table are suitable to be panoramically displayed. Nevertheless, the gnomonic normal/oblique projection may be the solution for recovering the fidelity of the document on the table.

Referring to FIG. 6 again, it shows the recovering method of the FIS image distorted by the equidistant lens while placing a planar object 22 normal to the optical axis 21. If a perspective-corrected image is targeted, the method to correct the image is to transform the principal distances of $\rho_i$ into the tangent value of the zenithal distance $\alpha_i$, i.e. $\rho_i' = k*\tan\alpha_i$, where k is an arbitrary number to control the imaging amplified ratio. If $k=f$, $\Delta OP'Q'$ is similar to $\Delta OPQ$, so every $\rho_i'$ is directly proportional to the corresponding physical scale. Otherwise, a gnomonic oblique projection is suitable to an oblique physical layout.

Figure 10:
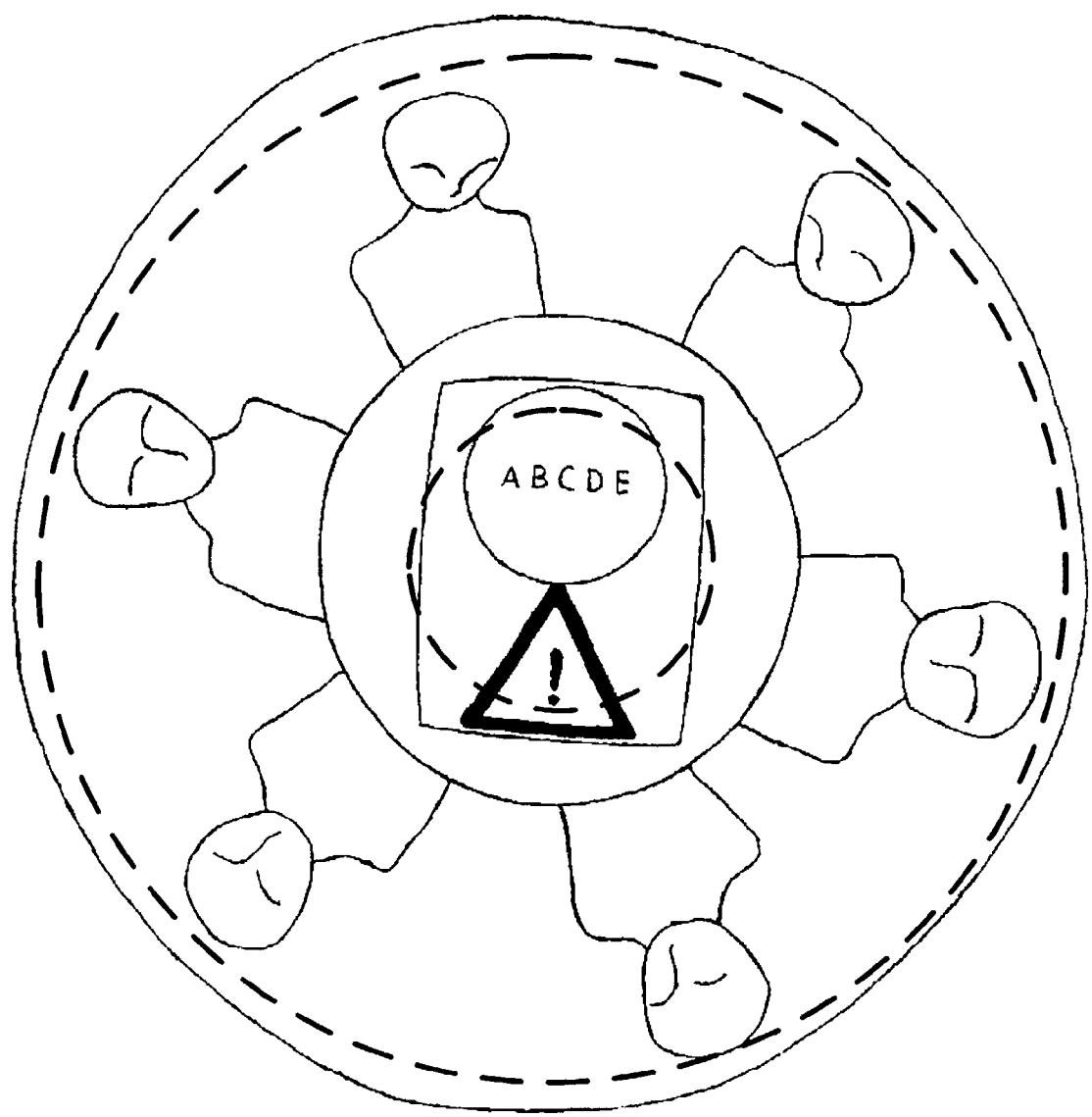
FIG. 10 outlines an original image taken by the FIS in a conference room.
Figure 11A:
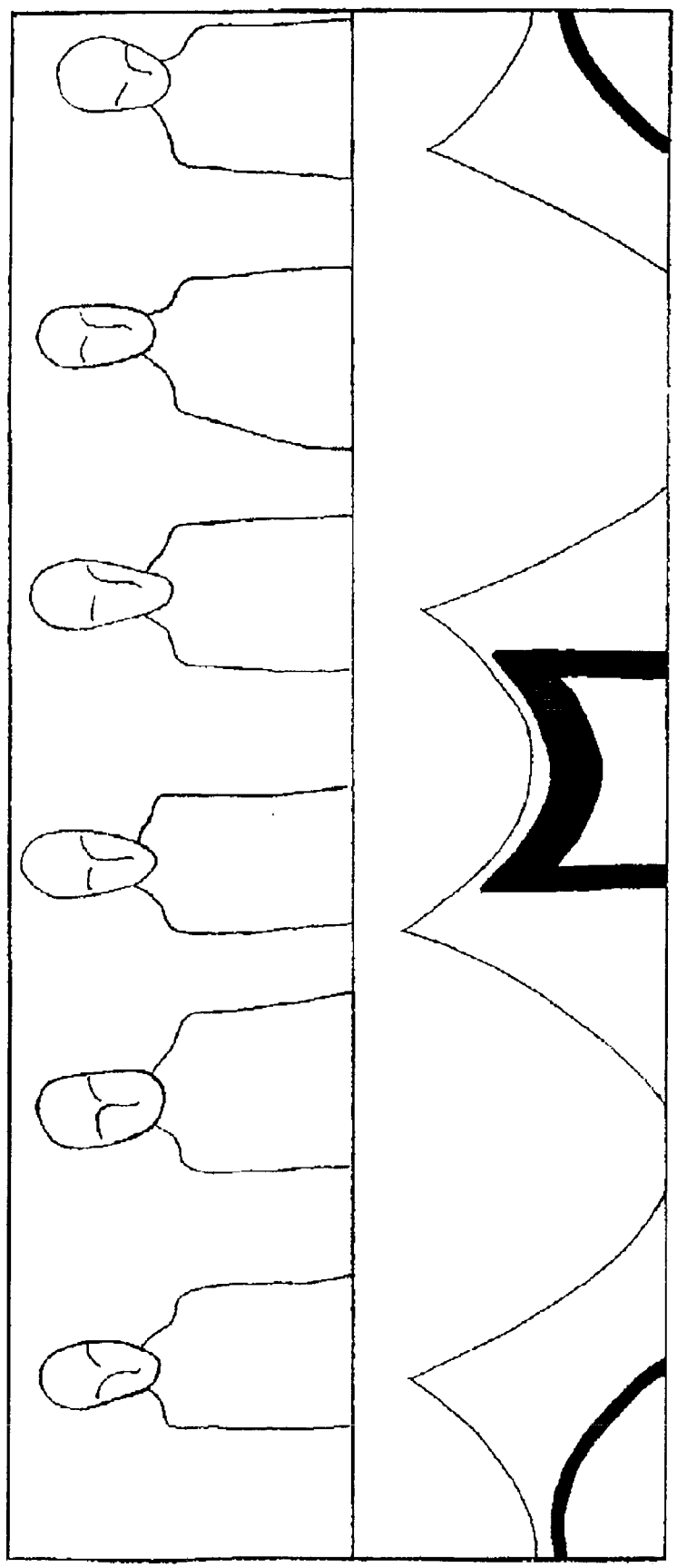
FIG. 11A outlines the panoramic view after transforming the image between the two dashed circles in FIG. 10 by means of the invention.
Figure 11C:
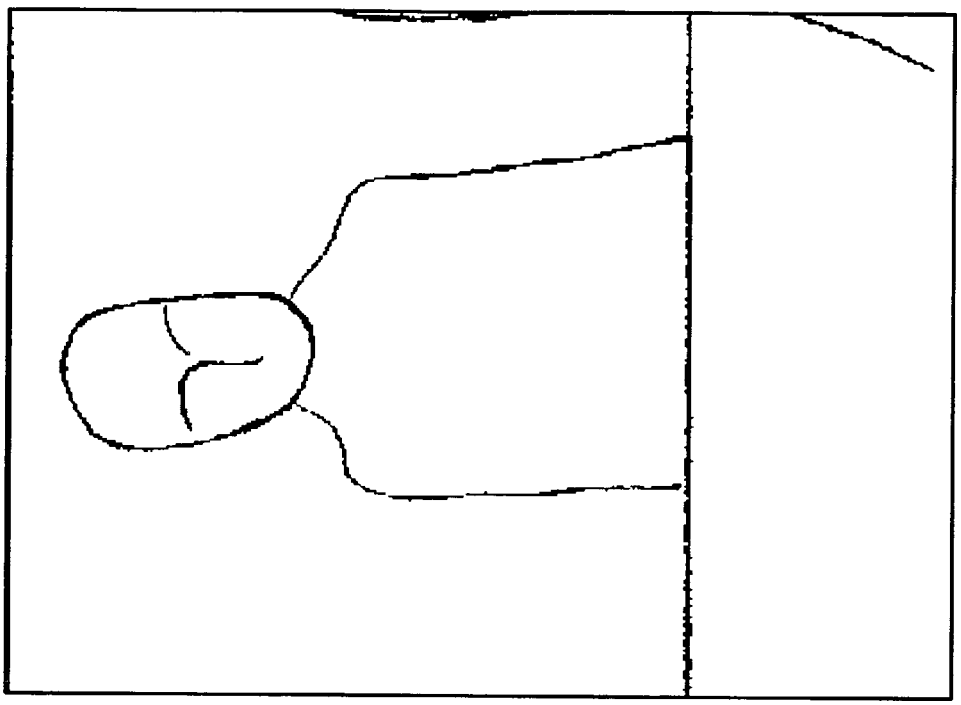
FIG. 11C shows a zoom-in detail of FIG. 11A.
Figure 11B:
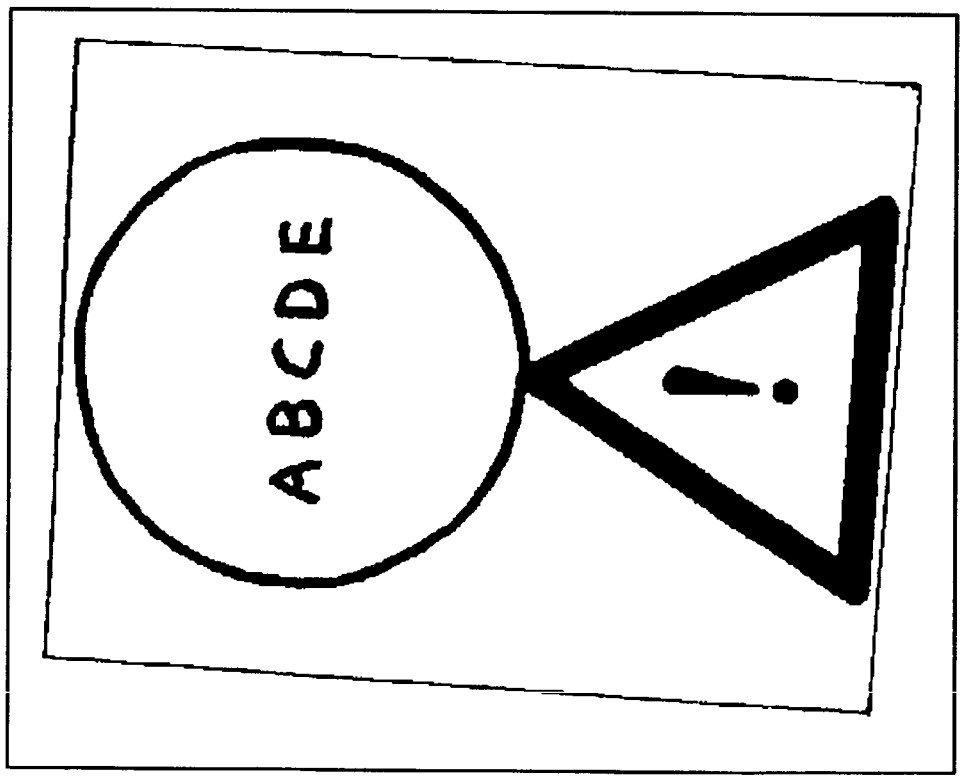
FIG. 11B outlines the azimuthal perspective view after transforming the image inside the interior dashed circle in FIG. 10 by means of the invention.

The one end of table-to-table teleconference is demonstrated as an example to verifying the proposed embodiment. With reference to FIG. 10, it is the skeleton of a picture shot by a FIS hanging on the ceiling to keep a conference under surveillance. The original scene is possessed of an unavoidable barrel distortion. A user-defined image area, such as the ring bounded by the two dashed circles respectively defining the inner and the outer borders in the figure, is transformed by the gnomonic cylindrical projection into a panorama. The result is shown in FIG. 11A, which displays all conferees around the table in one picture. Further feed the document area to be transformed by the gnomonic normal projection and zoom in the transformed picture by elongating the radius of the small sphere 30 so as to recover the fidelity of the document under the camera, shown in FIG. 11B. Besides, the spokesperson can be highlighted from FIG. 11A by enlarging the radius of the mapping cylinder 32, which is shown in FIG. 11C.

Overall, the invention is possessed of the following advantages:

1. The present invention utilizes an innovative optical method to parameterize the FIS and results in precise analysis of the projection models so that the horizontal and vertical vectors (u, v) of each imaged point on the image plane can be coded by the spatial zenithal and azimuthal distances ($\alpha$, $\beta$) and the morphologic fidelity is therefore recovered.
2. The small sphere is defined as the bridge for image transformation so as to take advantage of all technologies in cartography. It implies the potential of recoding, encrypting or compressing the images by switching among different but proper projection methods.
3. The image transforming method in the present invention is easy and simple and suitable for application in various FIS with different projection mechanisms.
4. The speed of transformation is extremely fast because the algorithm in the present invention is pretty simple.
5. Motion detecting in a panospherical scene (like in a panorama) turns into an effortless job in the invention by use of the FIS images.
6. The high precision of the optical parameters will greatly extend the applicable visual angles to the current visual systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for presenting fisheye-camera images, which employs a plurality of known optical parameters comprising a principal point, a focal length constant and a projection function obtained from a parameterized fisheye camera in order to transform an original image shot by the parameterized fisheye camera into a transformed image, the method comprises:

calculating a principal distance $\rho$ between an imaged point and the principal point in the original image and defining an azimuthal distance $\beta$ of the imaged point;

deriving a zenithal distance $\alpha$ of the imaged point according to the principal distance $\rho$, the focal length constant and the projection function;

normalizing the imaged point onto a small sphere as a normalized imaged point according to the zenithal distance $\alpha$ and the azimuthal distance $\beta$; and projecting the normalized imaged point onto a projection surface as a transformed imaged point by means of a map projection in cartography in order to form the transformed image.

2. The method according to claim 1, wherein the map projection is constructed by four elements comprising a light-source position, the projection surface, the orientation of the projection surface and the tangency of the projection surface.

3. The method according to claim 2, wherein the light-source position is selected from the group comprising a gnomonic projection, a stereographic projection and an orthographic projection.

4. The method according to claim 2, wherein the projection surface is selected from the group comprising a cylinder, a cone and a plane.

5. The method according to claim 2, wherein the orientation of the projection surface is selected from the group comprising a normal projection, a transverse projection and an oblique projection.

6. The method according to claim 2, wherein the tangency of the projection surface is selected from the group comprising a tangent projection and a secant projection.

7. The method according to claim 1, wherein the zenithal distance α is the angle extending from an optical axis of the parameterized fisheye camera to an incident ray which images the imaged point.

8. The method according to claim 1, wherein the azimuthal distance β is the angle of the imaged point surrounding an optical axis of the parameterized fisheye camera by referring to a prime meridian or a mapping domain of the prime meridian.

9. The method according to claim 1, wherein the center of the small sphere is located at a viewpoint of the parameterized fisheye camera.

10. The method according to claim 1, wherein the imaged point is located within a user-defined area in the original image.

11. A method for presenting fisheye-camera images, which employs a plurality of known optical parameters comprising a principal point, a focal length constant and a projection function obtained from a parameterized fisheye camera in order to transform an imaged point into a normalized imaged point, the method comprises:

calculating a principal distance ρ which is the distance between the imaged point and the principal point in an original image shot by the parameterized fisheye camera and defining an azimuthal distance β corresponding to the imaged point;

deriving a zenithal distance α corresponding to the imaged point according to the principal distance ρ, the focal length constant and the projection function; and normalizing the imaged point onto a small sphere as the normalized imaged point according to the zenithal distance α and the azimuthal distance β.

12. The method according to claim 11, wherein the zenithal distance α is the angle extending from an optical axis of the parameterized fisheye camera to an incident ray which images the imaged point.

13. The method according to claim 11, wherein the azimuthal distance β is the angle of the imaged point surrounding an optical axis of the parameterized fisheye camera by referring to a prime meridian or a mapping domain of the prime meridian.

14. The method according to claim 11, wherein the center of the small sphere is located at a viewpoint of the parameterized fisheye camera.

15. A method for presenting fisheye-camera images, which employs a plurality of known optical parameters comprising a principal point, a focal length constant and a projection function obtained from a parameterized fisheye camera in order to transform an original image shot by the parameterized fisheye camera into a panorama, the method comprises:

calculating a principal distance ρ between an imaged point and the principal point in the original image and defining an azimuthal distance β of the imaged point;

deriving a zenithal distance α of the imaged point according to the principal distance ρ, the focal length constant and the projection function;

normalizing the imaged point onto a small sphere as a normalized imaged point according to the zenithal distance α and the azimuthal distance β; and projecting the normalized imaged point onto a cylindrical surface as a transformed imaged point by means of a gnomonic projection in cartography in order to form the panorama.

16. The method according to claim 15, wherein an orientation of the projection surface is selected from the group comprising a normal projection, a transverse projection and an oblique projection.

17. The method according to claim 15, wherein a tangency of the projection surface is selected from the group comprising a tangent projection and a secant projection.

18. The method according to claim 15, wherein the zenithal distance α is the angle extending from an optical axis of the parameterized fisheye camera to an incident ray which images the imaged point.

19. The method according to claim 15, wherein the azimuthal distance β is the angle of the imaged point surrounding an optical axis of the parameterized fisheye camera by referring to a prime meridian or a mapping domain of the prime meridian.

20. The method according to claim 15, wherein the center of the small sphere is located at a viewpoint of the parameterized fisheye camera.

21. The method according to claim 15, wherein the imaged point is located within a user-defined area in the original image.

22. A method for presenting fisheye-camera images, which employs a plurality of known optical parameters comprising a principal point, a focal length constant and a projection function obtained from a parameterized fisheye camera in order to transform an original image shot by the parameterized fisheye camera into a perspective-corrected image, the method comprises:

calculating a principal distance ρ between an imaged point and the principal point in the original image and defining an azimuthal distance β of the imaged point;

deriving a zenithal distance α of the imaged point according to the principal distance ρ, the focal length constant and the projection function;

normalizing the imaged point onto a small sphere as a normalized imaged point according to the zenithal distance α and the azimuthal distance β; and projecting the normalized imaged point onto a plane as a transformed imaged point by means of a gnomonic projection in cartography in order to form the perspective-corrected image.

23. The method according to claim 22, wherein an orientation of the projection surface is selected from the group comprising a normal projection, a transverse projection and an oblique projection.

24. The method according to claim 22, wherein a tangency of the projection surface is selected from the group comprising a tangent projection and a secant projection.

25. The method according to claim 22, wherein the zenithal distance $\alpha$ is the angle extending from an optical axis of the parameterized fisheye camera to an incident ray which images the imaged point.

26. The method according to claim 22, wherein the azimuthal distance $\beta$ is the angle of the imaged point surrounding an optical axis of the parameterized fisheye camera by referring to a prime meridian or a mapping domain of the prime meridian.

27. The method according to claim 22, wherein the center of the small sphere is located at a viewpoint of the parameterized fisheye camera.

28. The method according to claim 22, wherein the imaged point is located within a user-defined area in the original image.

* * * * *